United States Patent Office 2,957,763
Patented Oct. 25, 1960

2,957,763
PROCESS FOR PRODUCING MIXED AMMONIUM NITRATE - MONOAMMONIUM PHOSPHATE PRILLS

Marion D. Barnes, Glendale, Mo., and John E. Lyon, Conway, Ark., assignors to Monsanto Chemical Company, St. Louis, Mo., a corporation of Delaware No Drawing. Filed Apr. 8, 1957, Ser. No. 651,169

10 Claims. (Cl. 71—64)

This invention relates to fertilizers and more particularly to the preparation of mixed fertilizers in granular or prill form.

The utility of ammonium nitrate as a commercial fertilizer has long been recognized. It is produced commercially in various physical forms, such as in the form of solutions, crystals, flakes, powders and granules or prills. Prilled ammonium nitrate, that is ammonium nitrate in the form of small roughly spherical granules, is a particularly convenient form of ammonium nitrate for commercial application. Heretofore such prills have been prepared by spraying a concentrated solution of ammonium nitrate into a gaseous cooling medium and recovering and drying the prills obtained. The aqueous solutions so sprayed were of a concentration which permitted spraying at temperatures not in excess of 140° C. According to the prior art, higher temperatures were not used because of the hazards involved and the inability to produce a satisfactorily stable prill at such elevated temperatures. In order to provide a more balanced plant food, a prill of mixed fertilizer has long been desired. The prilling techniques heretofore used are not applicable to the preparation of a mixed fertilizer prill.

It is an object of this invention to provide an improved process for the preparation of prills of mixed fertilizers. It is a particular object of this invention to provide a process for the preparation of a fertilizer prill containing ammonium nitrate and monoammonium phosphate. Other objects will become apparent from the description of the invention.

It has now been discovered that a highly useful and improved fertilizer prill can be prepared by spraying at a temperature in the range of from about 170° C. to about 225° C. a molten mixture containing from about 50 to about 85 parts by weight of ammonium nitrate and from about 50 to 15 parts by weight of monoammonium phosphate into a gaseous cooling medium maintained at a temperature below the crystallizing temperature of said mixture and recovering the prills thus obtained. It has been found that the prills thus obtained are free flowing, strong, dense, hard and of a relatively uniform size. The prills are extremely stable and exhibit a reduced tendency to cake even after exceedingly long periods of storage.

To illustrate this invention, molten mixtures of ammonium nitrate and monoammonium phosphate were prepared as set forth in the following Table I.

Table I

| Sample No. | Parts by Weight | |
|---|---|---|
| | $NH_4NO_3$ | $NH_4H_2PO_4$ |
| 1 | 50 | 50 |
| 2 | 60 | 40 |
| 3 | 75 | 25 |
| 4 | 85 | 15 |

Approximately 0.5% weight by water was added to each of these samples and the samples melted by heating to 175°–180° C. The molten mixtures were then fed under a pressure of 10 p.s.i.g. to an orifice plate containing nineteen 0.030" holes. The orifice plate was contained in the top of a vertical spray tower which measured 25' x 25' x 190' high. The tower contained atmospheric air maintained at approximately 30° C. As each mixture was sprayed into the tower through the orifice plate, small droplets of the mixture formed which solidified into hard prills upon falling through the height of the tower. The prills collected at the bottom of the tower and had cooled to a temperature of approximately 70°–80° C. The prills were allowed to cool to atmospheric temperature and then bagged. The final chemical analysis on three of the samples mentioned above were determined to be as indicated in Table II.

Table II
[Final chemical analysis (percent by weight)]

| Sample No. | P as $P_2O_5$ | Total N | $H_2O$ |
|---|---|---|---|
| | Percent | Percent | Percent |
| 2 | 10.84 | 30.50 | 1.03 |
| 3 | 16.77 | 28.00 | 0.15 |
| 4 | 23.23 | 25.70 | 0.11 |

A screen analysis of the prills showed 25–30% of the prills passing through the U.S. standard 12-mesh screen and being retained on the U.S. standard 14-mesh screen.

The remarkable stability of these prills is indicated by the cycling test. In this test, prills of samples 2, 3 and 4 mentioned above and prills of substantially 100% ammonium nitrate were adjusted to a moisture content of 0.2% by weight of $H_2O$. These prills were then sealed in glass capsules and placed in a cycling oven which fluctuated regularly from 25° C to 40° C. and back every four hours, passing through the critical transition temperature (32.3° C.) for pure ammonium nitrate every two hours. After 20 cycles, the prills of pure ammonium nitrate began to deteriorate. At 125 cycles, prills of Sample 4 of Table I began to deteriorate. The test was discontinued at 400 cycles and at that time prills of Samples 2 and 3 of Table I showed no sign of deterioration.

The process of this invention is applicable for the preparation of prills containing from about 50 parts by weight to about 85 parts by weight ammonium nitrate and from about 50 parts by weight to about 15 parts by weight monoammonium phosphate.

The melt to be sprayed in the prilling tower can be prepared in any convenient manner well known to those skilled in the art. The pure ingredients can be mixed and melted as shown in the preceding example or the melt can be prepared by reacting anhydrous ammonia with a mixture of phosphoric and nitric acids. The melt sprayed can be anhydrous or it can contain small amounts of water. Water has no deleterious effect on the spraying operation. Since substantially anhydrous prills are desired, any excessive quantities of water introduced in the spraying operation will have to be and can be removed by subsequent drying of the prills.

In accordance with this invention, the melt is sprayed at a temperature in the range from about 170° C. to about 225° C. and preferably in the range from about 175° C. to about 200° C. Temperatures in excess of 225° C. promote decomposition of ammonium nitrate and hence such excessive temperatures should be avoided. Temperatures much below 170° C. approach inoperability because of the relatively high melting point (about 165° C.) of the mixtures sprayed in accordance with this invention.

The size of the spraying tower is determined by the time required to permit the prills to harden sufficiently, taking into consideration the prilling temperature and the temperature of the gaseous cooling medium in the prilling tower. Generally, it is merely necessary to provide a tower of such size to permit the prills to cool to a temperature below the crystallizing point of the prills at which time a sufficiently hard shell will have formed. In the preferred mode of operation, the tower size and conditions are such as to permit the prills to cool to a temperature below about 84° C. The degree of cooling in the spray tower is not as critical in the spraying of mixed fertilizers in accordance with this invention as it is in the case of spraying aqueous solutions of ammonium nitrate. Any inert gaseous cooling medium can be employed. The gaseous medium can be static or under forced circulation. Static atmospheric air has proven to be satisfactory. The temperature of the gaseous cooling medium is not critical as long as it is sufficiently below the crystallizing point of the melt sprayed to permit formation of the prill in the cooling space and time provided.

The process of this invention produces substantially anhydrous prills without further drying. If a still further reduced moisture content is desired the prills may be further dried by any technique well known to those skilled in the art.

Prills prepared in accordance with the process of this invention need no further conditioning in order to constitute an acceptable article of commerce. If desired the prills of this invention can be coated by tumbling with various coating agents such as diatomaceous earth, limestone, gypsum, siliceous materials, etc.

What is claimed is:

1. A process for the production of mixed fertilizers in granular form which comprises spraying at a temperature in the range of from about 170° C. to about 225° C. a mixture containing from about 50 parts by weight to about 85 parts by weight of ammonium nitrate and from about 50 parts by weight to about 15 parts by weight of monoammonium phosphate into an inert gaseous cooling medium maintained at a temperature below the crystallizing temperature of said mixture.

2. The process as described in claim 1 wherein the spraying is carried out at a temperature in the range from about 175° C. to about 200° C.

3. A process for the production of mixed fertilizers in granular form which comprises spraying at a temperature in the range of from about 170° C. to about 225° C. a mixture containing from about 50 parts by weight to about 85 parts by weight of ammonium nitrate and from about 50 parts by weight to about 15 parts by weight of monoammonium phosphate into an inert gaseous cooling medium maintained at a temperature below the crystallizing temperature of said mixture to cool said mixture below its crystallizing point thereby forming granulars of said mixture.

4. A process as described in claim 3 wherein the spraying is carried out at a temperature in the range from about 175° C. to about 200° C.

5. A process for the production of mixed fertilizers in granular form which comprises spraying at a temperature in the range of from about 170° C. to about 225° C. a mixture containing from about 50 parts by weight to about 85 parts by weight of ammonium nitrate and from about 50 parts by weight to about 15 parts by weight of monoammonium phosphate into an inert gaseous cooling medium maintained at a temperature below the crystallizing temperature of said mixture to cool said mixture to a temperature below about 84° C. thereby forming said mixture into granules.

6. The process as described in claim 5 wherein the spraying is carried out at a temperature in the range from about 175° C. to about 200° C.

7. The process as described in claim 6 wherein the mixture sprayed contains about 50 parts by weight of ammonium nitrate and about 50 parts by weight of monoammonium phosphate.

8. The process as described in claim 6 wherein the mixture sprayed contains about 60 parts by weight of ammonium nitrate and about 40 parts by weight of monoammonium phosphate.

9. The process as described in claim 6 wherein the mixture sprayed contains about 75 parts by weight of ammonium nitrate and about 25 parts by weight of monoammonium phosphate.

10. The process as described in claim 6 wherein the mixture sprayed contains about 85 parts by weight of ammonium nitrate and about 15 parts by weight of monoammonium phosphate.

References Cited in the file of this patent

UNITED STATES PATENTS

| | | |
|---|---|---|
| 1,742,448 | Meyers | Jan. 7, 1930 |
| 2,774,660 | Cook et al. | Dec. 18, 1956 |
| 2,782,108 | Antle | Feb. 19, 1957 |
| 2,798,801 | Kieffer et al. | July 9, 1957 |